United States Patent [19]

Zastrow et al.

[11] Patent Number: 5,163,254
[45] Date of Patent: Nov. 17, 1992

[54] STUD SHIELD

[76] Inventors: Thomas S. Zastrow, 1923 Portland Ave., St. Paul, Minn. 55104; Raymond P. VinZant, 1332 Bayard Ave., St. Paul, Minn. 55116

[21] Appl. No.: 630,310

[22] Filed: Dec. 19, 1990

[51] Int. Cl.⁵ .............................................. E04B 5/48
[52] U.S. Cl. ....................................... 52/27; 52/220; 52/357; 52/408; 174/48; 174/135
[58] Field of Search .................. 52/384, 27, 220, 221, 52/357, 517, 717, 717.1, 420, 127.1, 127.2, 721, 480, 481, 483, 346, 403, 408, 317; 174/48, 135

[56] References Cited

U.S. PATENT DOCUMENTS

| | | | |
|---|---|---|---|
| 2,178,388 | 10/1939 | Beckman | 52/514 |
| 2,277,758 | 3/1942 | Hawkins | 52/514 |
| 2,637,995 | 5/1953 | Mann | 52/125.2 |
| 2,878,666 | 3/1959 | Drummond | 52/391 |
| 3,121,977 | 2/1964 | Bersudsky | 52/385 |
| 3,211,824 | 10/1965 | Heiman | 52/220 |
| 3,211,825 | 10/1965 | Clos | 52/220 |
| 3,240,869 | 3/1966 | Jureit | 52/220 |
| 3,270,473 | 9/1966 | Smith | 52/390 |
| 3,297,815 | 1/1967 | Drettmann | 52/220 |
| 3,307,306 | 3/1967 | Oliver | 52/420 |
| 3,350,501 | 10/1967 | Jureit | 174/48 |
| 3,553,346 | 1/1971 | Ballantyne | 174/48 |
| 3,596,422 | 8/1971 | Boettcher | 52/376 X |
| 3,689,681 | 9/1972 | Searer et al. | 174/48 |
| 3,863,412 | 2/1975 | Bodycomb et al. | 52/346 X |
| 4,021,981 | 5/1977 | Van Wagoner | 52/408 |
| 4,050,205 | 9/1977 | Ligda | 52/357 |
| 4,759,164 | 7/1988 | Abendroth et al. | 52/480 X |
| 4,910,936 | 3/1990 | Abendroth et al. | 52/480 X |
| 4,924,646 | 5/1990 | Marquardt | 52/221 |

Primary Examiner—David A. Scherbel
Assistant Examiner—Robert Cornfield

[57] ABSTRACT

A stud shield for protecting the service and utility conduits in building walls is provided. The shield includes a generally rectangular steel plate having a wall sheeting facing side and a stud facing side. An adhesive tape is secured to the sheeting facing surface and extends past the side edges of the plate. A release layer is adjacent the stud facing side of the plate and contacts the portions of the adhesive tape extending past the edges of the plate.

The present invention also encompasses that the shields may be distributed one at a time or may be made available as a unitized plurality of shields, wherein a selected number of shields may be removed from an endless roll as needed.

18 Claims, 2 Drawing Sheets

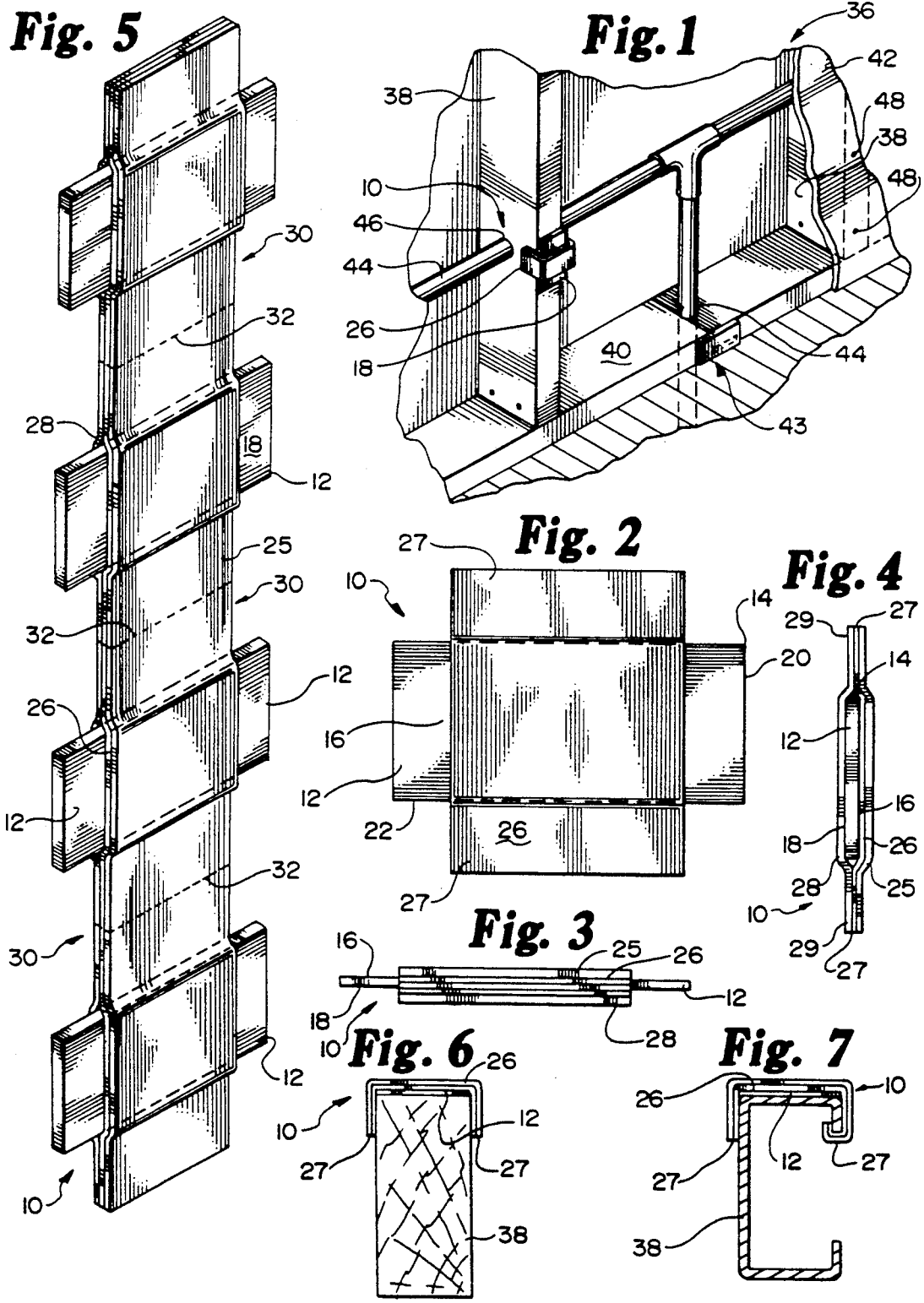

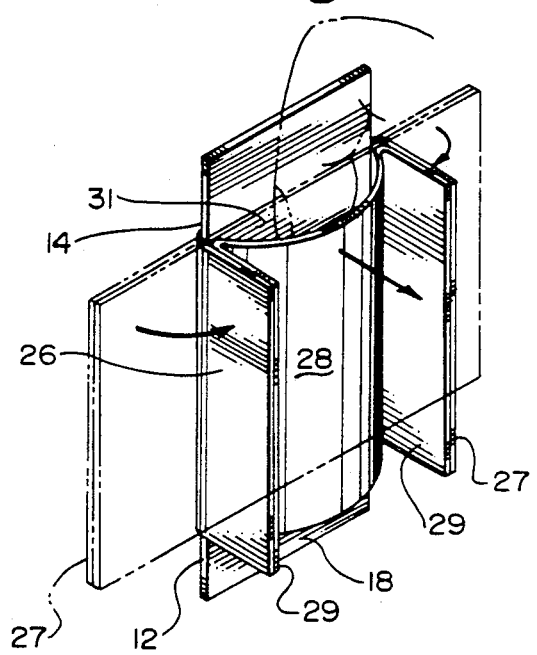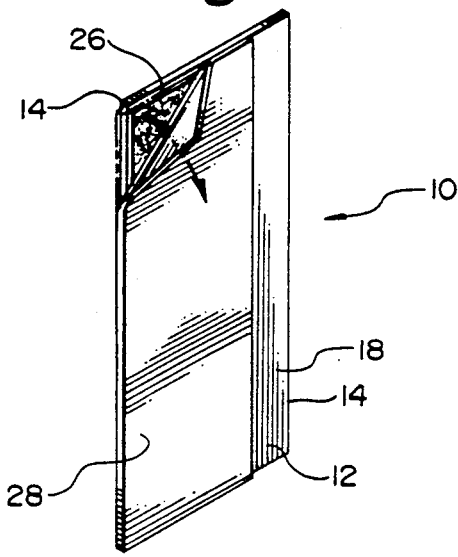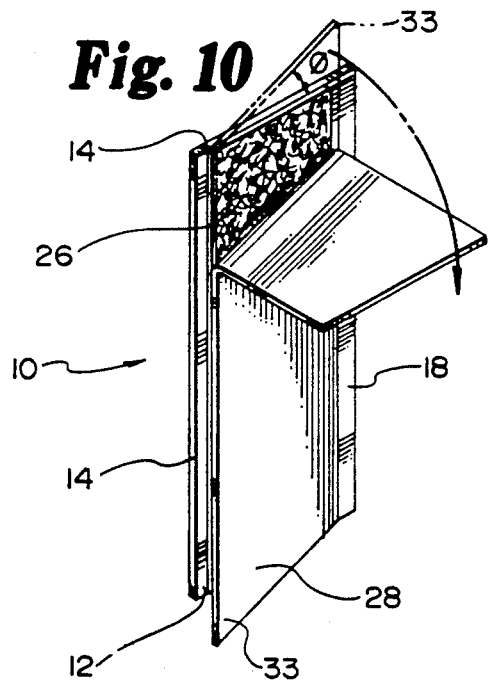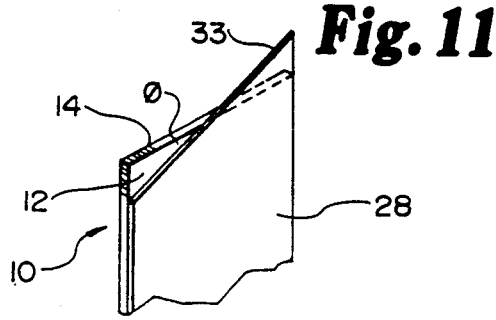

STUD SHIELD

TECHNICAL FIELD

The present invention relates to protective plates for use in the construction industry and, more particularly, to a protective plate for protecting the various conduits running through sheeting support walls, wherein the plate is provided with means for securing the plate to a support adjacent a conduit passing through that support.

BACKGROUND OF THE INVENTION

A large number of service or utility conduits, including electrical, plumbing or gas conduits, are placed in the walls of buildings behind the wall sheeting, gypsum board, other wallboard or paneling covering the walls. Typically, this requires that the conduits pass through the generally vertical and horizontal individual support members or studs on which the wall sheeting is fastened.

In-wall, support member traversing routing of service conduits is convenient and enables an attractive, well-serviced room, but it also generates a long recognized problem. Specifically, since the overlying wall sheeting is usually nailed or screwed into place on the support framework, there is a substantial likelihood that the fasteners used to attach the sheeting material to studs will penetrate a conduit. Potential consequences include plumbing leaks, electrical problems and the expensive inconvenience of removing and replacing sections of finished wall.

Various attempts have been made to prevent damage to conduits running in walls. Such attempts are represented in the prior art and include cable protector plates of the type disclosed in U.S. Pat. Nos. 3,240,869 and 3,350,501. This type of plate has integral teeth that may be hammered or otherwise driven into a wall support member or stud. Somewhat similarly, U.S. Pat. Nos. 3,689,681 and 4,924,646 disclose wire or electrical protecting devices for being received in a notch formed in face of the stud. Two other protective devices are disclosed in U.S. Pat. Nos. 3,211,825 and 3,553,346. Like the protectors in the other cited patents, the protectors in the latter two patents are designed to be hammered or forced into the stud members.

U.S. Pat. No. 4,050,205 discloses a protective shield for preventing a wall panel fastener from entering a utility service opening in a metallic-type wall stud. The shield has integral clips at the side edges thereof for resilient clamping engagement of the stud or framing member.

While the prior art, including the patents cited above, discloses refinements in protective devices for protecting conduits running through stud walls, there are some remaining problems. For example, many of the commercially available and prior art conduit protection devices are designed for use only in notches or cut out areas in the studs comprising a stud wall. Such devices may not work adequately for protecting conduits running in apertures in the generally central region of wall stud unless a receiving notch is first cut in the stud.

Another problem is that many of the prior art protective plates must be driven or hammered into engagement with a stud. To this end, many of the protective devices include integral spikes, punch-out securing tabs or clamp-type members requiring the use of tools for securing the plates in a selected location.

It would be advantageous if a protective plate could be provided with an integral securing means whereby the plate could be attached easily and quickly to any wall stud adjacent a conduit without requiring the use of any tools or modifications of the stud. Ideally, the plate would be as structurally simple, reliable and convenient as possible.

It would also be advantageous if the protective plates could be sold individually, one plate at a time, and if they could be made available in a convenient delivery means wherein a plurality of the plates are available for sequential application to studs along the length of a conduit running through the studs comprising a wall support system.

A stud shield for use with either wooden or metal stud wall systems, having an integral, easily used securing means for selectively and quickly adhering the stud shield in a selected location adjacent a conduit running through the stud wall would be a decided improvement over the protective devices disclosed in the prior art.

SUMMARY OF THE INVENTION

A stud shield for protecting the service conduits in a wall system is provided. The shield comprises a generally rectangular steel plate having a wall sheeting facing surface and a stud facing surface. A single-sided, adhesive backed tape is secured to the sheeting facing surface of the plate and extends past the side edges thereof. A release layer is adjacent the opposite side of the steel plate and contacts the ends of the adhesive tape extending past the edges of the plate to protect the adhesive until the shield is ready to be applied.

The present invention also encompasses that the shields may be distributed individually or may be available as a unitized endless roll of a plurality of shields wherein a selected number of shields may be removed from the endless roll as needed.

One of the advantages of the present invention is that it enables a person to selectively position and install a stud shield on a stud without resorting to hammers or other tools to affix the shield in the selected place. Thus, installation efficiency is increased and construction expenses are reduced. Additionally, the stud shield of the present invention may be used for both wooden studs and metallic studs.

It is an object of the present invention to provide a reliable, simple and inexpensive protective device that is positioned conveniently and easily on a stud wall, yet provides significant protection for conduits running through the wall.

Another object of the present invention is to provide a stud shield distributed to and used by users as a unit item or as a serial plurality of shields on endless length of material whereby a selected number of shields may be separated for use from the remaining plurality of shields.

Yet another object of the present invention is to provide a stud shield that substantially complies with current applicable building codes and provides protection for all types of conduits commonly run through stud wall systems.

Other objects, features and advantages of the present invention will become more fully apparent and understood with reference to the following specification and to the appended drawings and claims.

BRIEF DESCRIPTION OF THE DRAWINGS

FIG. 1 is a perspective view of the stud shields of the present invention installed in a wall system.

FIG. 2 is a top plan view of the first embodiment of the present invention.

FIG. 3 is a front elevational view of the first embodiment.

FIG. 4 is a side elevational view of the first embodiment.

FIG. 5 is a perspective view of the third embodiment of the stud shields of the present invention.

FIG. 6 is a top plan of the first embodiment of the present invention installed on a wooden stud.

FIG. 7 is a top plan view of the first embodiment of the present invention installed on a metal stud.

FIG. 8 is a perspective view of the first embodiment depicting the use of the present invention at the point-of-use.

FIG. 9 is a perspective view of a second embodiment of the present invention.

FIG. 10 is a perspective view of a modified form of the second embodiment.

FIG. 11 is a fragmentary perspective view of another modified form of the second embodiment.

DETAILED DESCRIPTION OF THE PREFERRED EMBODIMENT

Referring to the drawings, FIGS. 1 through 4 depict a stud shield 10 in accordance with the present invention. The shield 10 includes a generally planar, flat-sided steel plate 12 having peripheral edges 14, an outwardly or sheeting facing side 16, and a stud facing side 18. The plate 12 is generally rectangular and, in the preferred embodiment, has a width 20 of approximately one and three-eighths of an inch to one and one-half of an inch, or matches the nominal width of commercially available "2×4" or "2×6" studs. A preferred plate length 22 is about three inches and a preferred plate thickness range is approximately 0.025 of an inch to one-sixteenth of an inch. The plate 12 may be made of heat-treated steel or cold-rolled galvanized steel.

It is not beyond the scope of the present invention that other suitable materials be used to form the plate 12. Examples include various hard plastics or hardened glass, as well as fiberglass or metallic alloys. The stated dimensions of the plate 12 are preferred, but the plate 12 may be provided in a variety of appropriate widths, lengths or thicknesses depending on needs and building codes. Generally, as long as sufficient resistance to penetration is maintained to meet applicable building codes and requirements, it is preferable to make the plate 12 as thin as practical, for example, using 0.031 inch heat-treated steel. Using a thinner plate may reduce or eliminate finish work, such as "mudding in" and sanding, that may be required after the wall sheeting is in place.

With continued reference to FIGS. 2 through 4, the stud shield 10 of the present invention includes a single-sided, pressure sensitive adhesive tape 26 with a backing 25. A selected length of the tape 26 is adhered to the sheeting facing side 16 of the plate 12. For each individual plate 12, the tape 26 covers substantially all of the sheeting side 16 of the plate 12 and the ends 27 of the tape 26 extend beyond the plate edges 14 for approximately one-half inch to one inch, five-eighths of an inch of extension beyond the plate 12 being preferred. Adjacent the inwardly facing or stud contacting side 18 of the plate 12 and the tape 26, there is a layer of release material or liner 28. The release liner 28 overlies the stud facing side 18 of the plate 12 and the ends 29 of the liner 28 contact the overhanging portions 27 of the tape 26 that extend beyond the edges 14 on both sides of the plate 12.

Although the tape 26 depicted does not extend for the full length 22 of the plate 12, it is not beyond the scope of the present invention that the entire sheeting facing side 16 is covered by the adhesive tape 26 and that either most or the entire stud facing side 18 of the plate 12 is covered with the release liner 28.

A second embodiment of the stud shield 10 of the present invention is depicted in FIGS. 9, 10 and 11. The adhesive tape 26, in this embodiment a transfertype adhesive tape, and the associated release liner 28 cover substantially all of the stud facing side 18 of a plate 12. As depicted in FIGS. 10 and 11, the tape 26 and liner 28 may be cut at an angle $\phi$ of between ten and twenty-five degrees adjacent the periphery of the plate 12, whereby a tab 33 for facilitating removal of the liner 28 from the tape 26 is formed at the short sides of the plate 12.

The third embodiment of the invention 10 is illustrated in FIG. 5, commonly numbered with the other Figures. In this embodiment, the tape 26 and release liner 28 sandwiching the plate 12 are provided as a continuous length or web of material 30. A plurality of plates 12 are spaced along the length of the rollable material 30. The continuous length material 30, comprising backing 25, tape 26 and release liner 28, has perforated tear lines 32 between individual plates 12 for facilitating the removal of plates 12 sequentially from the length of material 30. The depicted embodiment may be available as a continuous length 30 rolled on a core or about itself for packaging and/or distribution (not depicted). As in the second embodiment (FIG. 10), the perforated lines of weakness 32 may be at a selected angle relative to the edges of the plate 12 to facilitate the removal of the release liner 28 from the adhesive tape 26 (or from the sticky side or sides of the plate 12).

FIG. 1 depicts a representative building wall 36 including a plurality of studs 38 and/or sills 40 to which wall sheeting 42 is attached. To accommodate a conduit 44, an aperture 46 is drilled in a generally vertical stud 38. The stud shield 10 of the present invention is depicted installed superficially on the stud 38 so the conduit 44 will be protected from the conventional fasteners 48, such as screws or nails, conventionally used to fasten the wallboard 42 to the studs 38. The second embodiment of the shield 10, wherein an adhesive transfer tape 26 covers substantially all of the stud facing side 18 of the plate 12, is depicted at 43.

FIGS. 6 and 7 depict that the stud shield 10 of the present invention may be used either with wooden studs 38 (FIG. 6) or steel studs 38 (FIG. 7).

In use, the location where conduit protection is required is determined. A single shield 10 is grasped, or separated from the delivery roll (not depicted) of the third embodiment. As depicted in FIG. 8, the ends 27 of the tape 26 are curved around the plate edges 14 into a U-shape with the plate 12 at the base of the U-shape. This forms a loop or gap 31 between the liner 28 and the stud facing side 18 of the plate 12. The loop 31 facilitates the removal of the liner 28 from the adhesive tape 26 by providing a means whereby the liner 28 may be easily grasped, even with gloves on. The release liner 28 is removed from the ends 27 of the adhesive tape 26 and the plate 12 is positioned in a selected location. As depicted in FIGS. 6 and 7, the free ends 27 of the adhesive tape 26 are placed into contact with the side surfaces of the stud 38 to fix or adhere the shield 10 in the selected location.

A number of variations of the present invention can be made in addition to the changes mentioned above. The shield 10 may be fabricated in various lengths and widths to accommodate various sizes of building materials and the dimensions of the steel plate 12 may be varied as required to meet building codes or special needs of a particular construction. The length of free ends 27 of the adhesive tape 26 and release liner 28 overhanging the edges 14 of the plate 12 may be varied as long as there is sufficient length to secure the shield 10 in place. For the embodiments depicted in FIGS. 9 and 10, the tape 26 and liner 28 may overhang all or any selected one or more of the plate edges 14 to provide a tab edge means for easily grasping and stripping the liner 28 from the tape 26. The present invention may be used over notches in stud walls and the length may be varied to accommodate notches of different lengths (not shown). Additionally, indicia or instructions for use may be provided on the shield 10.

An important commercial advantage of the present invention is that it may be installed without using tools, saving substantial time and money in the construction process.

Although a description of the preferred embodiment has been presented, it is contemplated that various changes, including those mentioned above, could be made without deviating from the spirit of the present invention. It is therefore desired that the present embodiments be considered in all respects as illustrative, not restrictive, and that reference be made to the appended claims rather than to the foregoing description to indicate the scope of the invention.

What is claimed is:

1. A shield for conduits traversing studs in stud walls for supporting sheeting fastened thereto, said shield comprising:
   a plate of sufficient strength to prevent penetration by conventional sheeting fasteners used in a conventional manner, said plate having a periphery, a stud facing surface, and an outwardly facing surface;
   a single-sided adhesive tape, said tape applied to said outwardly facing surface and extending beyond said perphery; and
   a release liner adjacent to said stud facing surface and extending beyond said periphery, said release liner and said adhesive tape being generally coextensive.

2. The shield according to claim 1, wherein said plate is generally rectangular.

3. The shield according to claim 2, wherein said adhesive tape and release liner extend beyond said periphery on two sides of said plate.

4. The shield according to claim 3, wherein said plate is formed from 16-gauge galvanized steel.

5. The shield according to claim 3, wherein said plate is formed from heattreated steel.

6. The shield according to claim 3, wherein said generally rectangular plate has a width substantially conforming to the nominal width of commercially available studs.

7. The shield according to claim 1, wherein said adhesive tape and release liner comprise a continuous length, a plurality of said plates being serially spaced along said length.

8. The shield according to claim 7, wherein said continuous length includes transverse lines of weakness between adjacent plates, whereby a selected number of said plates may be separated from said continuous length.

9. A shield for conduits traversing studs in stud walls for supporting sheeting fastened thereto and in which said shield is positioned between the traversing studs and the sheeting, said shield comprising:
   a plate of sufficient strength to prevent penetration by sheeting fasteners, said plate having a periphery, a stud facing surface, and an outwardly facing surface, said stud facing surface comprising a generally flat, planar surface throughout;
   an adhesive carried on said stud facing surface; and
   a release liner adjacent to said stud facing surface and being generally co-extensive with said adhesive.

10. The shield according to claim 9, wherein said release liner extends beyond said periphery.

11. The shield according to claim 9, wherein an adhesive is carried on said stud facing surface, said adhesive underlying said release liner and being substantially coextensive with that portion of said release liner within the periphery of said plate.

12. The shield according to claim 11, wherein said adhesive is an adhesive transfer tape.

13. The shield of claim 9 wherein said generally flat, planar stud facing surface is adapted for contact with a stud throughout its entire surface.

14. The shield of claim 9 wherein said plate is comprised of a metal plate in which said stud facing and outwardly facing surfaces extend to said periphery and are parallel to each other throughout.

15. A delivery means for delivering stud shields for protecting conduits traversing support members in building wall systems, said delivery means comprising:
   a plurality of generally planar and rectangular, two-sided stud shields;
   a continuous length of adhesive tape contacting one side of each shield;
   a continuous length release liner generally coextensive with said length of said adhesive tape, said release liner adjacent the second side of each shield; wherein
   said plurality of shields is between and serially spaced along said coextensive continuous length of said adhesive tape and release liner, said release liner contacting said adhesive tape between said plates.

16. The delivery means according to claim 15, wherein said release liner and adhesive tape have transverse lines of weakness between said plates, whereby a selected number of said plates may be removed from said delivery means.

17. The delivery means according to claim 16, wherein said lines of weakness are generally parallel to the edges of said plates.

18. The delivery means according to claim 16, wherein the lines of weakness on the release liner intersect the edges of said plates at an angle.

* * * * *